United States Patent Office 2,802,804
Patented Aug. 13, 1957

2,802,804

VINYLIDENE CHLORIDE RESINS PLASTICIZED WITH ACETALS AND METHOD OF EXTRUDING SUCH COMPOSITIONS

Robert J. Reid, Canal Fulton, and Byron H. Werner, Akron, Ohio, assignors to The Firestone Tire & Rubber Company, Akron, Ohio, a corporation of Ohio No Drawing. Application November 3, 1954, Serial No. 466,686

20 Claims. (Cl. 260—33.2)

This invention relates to the use of acetals in crystalline homopolymers and copolymers of vinylidene chloride. These materials are heat stabilizers and processing aids.

The foregoing crystalline polymeric resins have been known for some time. They have been used to a substantial extent in the manufacture of films and filaments for various purposes, but the extrusion has presented various difficulties. The high temperatures necessary for processing are very close to the decomposition temperature of the composition. Therefore, it is essential that some additive be used to stabilize the resin against the deteriorating effect of heat and to lower the processing temperature below the critical range with minimum deleterious effect on the products obtained. In the past, separate additives have been used: one to stabilize against the action of heat, and the other to plasticize the resin. The acetals of this invention perform both functions.

Vinylidene resins are characterized by crystalline behavior, i. e., they fuse sharply to form relatively fluid melts. On quenching and orienting, the extruded filaments and films are crystalline in character. A syndrome of this crystalline habit is the recalcitrance of these resins to compounding: The macromolecules of these resins prefer contact with each other and tend to reject any foreign substances such as plasticizers and the like. In the random structure obtained without orientation any added ingredient of limited compatibility, such as the processing aids of this invention, is retained in larger percentages than is possible in the stretched or oriented products. On stretching, the tendency toward exudation or spewing is considerably increased. In orienting films and filaments of vinylidene resins they are stretched to several times their original length, and ordinarily until there is a sharp rise in the modulus. It is difficult to provide suitable processing aids which do not exhibit an undesirable spew or bloom on the surface of the oriented products and which in addition possess good heat and light stability or which at least are not detrimental to such stability.

Thus, the problem of providing beneficial additives for these crystalline resins is complicated not only by the fact that they tend to reject and spew the majority of conventional plasticizers, but many conventional resin-compounding ingredients tend to decompose or react with other compounding ingredients at the extrusion temperatures of the hot melts which are in the neighborhood of 170° C.

The crystalline resins to which the acetals of this invention are added include both homopolymers of vinylidene chloride and copolymers thereof with not more than substantially 15 percent of other unsaturated compounds copolymerizable therewith. The copolymers contain at least substantially 85 percent of vinylidene chloride. Suitable comonomers for the copolymerization include, for example, vinyl chloride, vinyl fluoride, vinyl acetate, styrene, acrylic and methacrylic esters such as methyl methacrylate, ethyl methacrylate and the like, acrylonitrile, vinyl-type ethers and ketones such as methylvinyl ether, methylvinyl ketone and related compounds such as methylisopropenyl ketone and the like. For a more complete list of compounds known to copolymerize with vinylidene chloride to produce resins which can be plasticized as herein described see Krczil, "Kurzes Handbuch der Polymerisationstechnik," vol. II "Mehrstoffpolymerization" Edwards Bros., Inc., p. 739, the items indented under "vinylidene chlorid."

The acetals of this invention have the formula

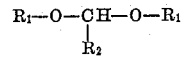

in which $R_1$ is from the group consisting of (1) alkyl groups of 1 to 5 carbon atoms, (2) aralkyl groups in which the aryl group of the aralkyl is from the class consisting of phenyl and substitute phenyls with 1 to 5 substituents from the class consisting of chlorine and alkyl substituents of 1 to 3 carbon atoms, the total number of carbon atoms in all said alkyl substituents combined being not greater than 4, and the alkyl of the aralkyl contains 1 to 3 carbon atoms, and (3) aryloxyalkyl in which the aryl group is from the class consisting of phenyl and substituted phenyls with 1 to 5 substituents from the class consisting of chlorine and alkyl substituents of 1 to 3 carbon atoms, the total number of carbon atoms in all said alkyl substituents combined being not greater than 4, and the alkyl group contains 1 to 2 carbon atoms; and $R_2$ is from the class consisting of (1) hydrogen, (2) methyl, (3) styryl, (4) aryl groups from the class consisting of phenyl and substituted phenyls with 1 to 5 substituents from the class consisting of chlorine and alkyl substituents of 1 to 3 carbon atoms, the total number of carbon atoms in all said alkyl substituents combined being not greater than 4, and (5) aralkyl groups in which the aryl group of the aralkyl is from the class consisting of phenyl and substituted phenyls with 1 to 5 substituents from the class consisting of chlorine and alkyl substituents of 1 to 3 carbon atoms and the alkyl group of the aralkyl contains 1 to 3 carbon atoms, the total number of carbon atoms in all said alkyl substituents combined being not greater than 4; provided, however, that when $R_2$ is hydrogen or alkyl, $R_1$ may not be alkyl.

For example, in those cases where $R_1$ is an alkyl group it may be methyl, ethyl, any propyl, any butyl, or any amyl. Where $R_1$ is aralkyl it may be benzyl, alpha-methylbenzyl or phenylethyl. Instead of the aryl group of the foregoing aralkyl radicals being phenyl, it may be monochlorophenyl, dichlorophenyl up to pentachlorophenyl, with the chlorines in any position in the ring; or it may be tolyl, ethylphenyl, propylphenyl, ethyltolyl, xylyl, propylxylyl, or other phenyl substituted with 1 to 5 alkyl groups of 1 to 3 carbon atoms; or it may be chlorotolyl, dichloroxylyl or other phenyl with both chloro- and alkyl (1 to 3 carbon) substituents. $R_1$ may likewise be phenoxymethyl or phenoxyethyl, and the phenyl of such radicals may be substituted with 1 to 5 chlorine or alkyl (1 to 3 carbon) substituents, as, for example, monochlorophenyl, trichlorophenyl, tolyl, dichloroxylyl, etc. The $R_2$ group may be hydrogen or a methyl, phenyl, benzyl, alpha-methylbenzyl, phenylethyl, ethylphenyl, monochlorophenyl, dichlorophenyl, pentachlorophenyl, tolyl, chloroxylyl, or styryl group, with phenyl in any of the foregoing positions substituted with 1 to 5 chlorine or alkyl (1 to 3 carbon) substituents.

Examples of suitable acetals follow: Acetals of formaldehyde with benzyl alcohol, phenylmethylcarbinol, phenoxyethanol, beta-phenylethanol; acetals of acetaldehyde with benzylalcohol, phenylmethylcarbinol, beta-phenylethanol, phenoxyethanol; and acetals of any of the foregoing alcohols or their equivalents with benzaldehyde, chlorobenzaldehydes, phenylacetaldehyde, phenylpropionaldehyde and cinnamaldehyde. The acetals may be used alone or in mixtures.

There is nothing novel in the preparation of the acetals. The procedure employed is similar to that disclosed by Vogel, Chem. Soc., 622–4 (1948). It follows:

*Preparation of formal of phenylmethylcarbinol*

To a 500 ml. 3-necked flask was added 201.6 grams (1.65 g. moles) phenylmethylcarbinol and 24.8 grams (0.825 g. moles) paraformaldehyde. The flask was equipped with a stirrer, thermometer, condenser, and heating mantle. Then 2.0 grams of sublimed anhydrous ferric chloride was added and the reaction mixture was heated to 95–100° C. for a period of six hours without stirring. At the end of the heating period the reaction mixture was rinsed into a 600 ml. beaker with 50 ml. of ether and 100 ml. of a 10 percent potassium carbonate aqueous solution. The mixture was then stirred, filtered, and the black residue on the filter washed with 100 ml. ether. The aqueous phase was then discarded and the organic layer washed with a solution of 10 grams potassium carbonate in 250 ml. distilled water and 15 ml. of 30 percent hydrogen peroxide to remove the excess formaldehyde. The organic layer was then washed with two 500 ml. portions of distilled water, separated in a 1-liter separatory funnel, and dried 16 hours over 10 grams anhydrous potassium carbonate.

The reaction product was fractionated through a 20 cm. column, 30 mm. inside diameter, packed with 7 mm. Raschig rings. After most of the ether was removed, reduced pressures were applied. The product was collected at 124° C. at 0.9 mm. of mercury, to 144° C. at 2.1 mm. mercury. It yielded 70 grams of a water-white liquid of the following properties:

$$d_4^{20} = 1.02, \; n_D^{20} = 1.5305$$

Analyzed for oxygen, the material was found to contain 12.48 percent whereas the theoretical oxygen content is 12.45 percent.

Various acetals were prepared in this manner. Others were prepared azeotropically. They are non-toxic, non-allergenic, and relatively odorless. In addition they do not appreciably increase the tendency of oriented films or filaments to shrink when exposed to elevated temperatures. They were evaluated for heat stability, light stability, and for spew rating. For these tests a resin prepared from 15 parts vinyl chloride to 85 parts vinylidene chloride was compounded in a petroleum ether slurry with 8 parts of the acetal per 100 parts of the resin, with 2 parts of 4-t-butyl phenyl salicylate as a light stabilizer, after which the petroleum ether was removed. The methods of testing follow.

*Compounding and testing*

With regard to the use of the acetals, a small amount, in the range of 3 to 8 percent or up to 10 percent based on the weight of the resin will generally be found most satisfactory. Less than 3 percent may be used in admixture with another stabilizer or under conditions which demand minimum stability. Such percentages will be stably retained within the resin in the finished oriented article. In no case will more than about 10 percent of the acetal be employed in a vinylidene resin because such larger amounts are incompatible and exude to the surface of oriented products produced from vinylidene polymeric resins containing 85 percent or more of vinylidene chloride.

*Heat stability*

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was—

1. Heat for three minutes with steam at 120 lbs./sq. in. and mold pressure of 1000 lbs./sq./in.;
2. Water cool for two minutes under 1000 lbs./sq./in. mold pressure; and
3. Eject from the press.

The resultant cylindrical button (1.25 inches in diameter and .125-.188 inch in height) was then cut into sector-shaped specimens which were placed in a forced draft oven at 180° C. Specimens were removed at intervals of 10, 20, and 30 minutes after placing in the oven, and the behavior of the specimens on the test as a whole was rated by the operator.

*Light stability*

On gram samples of the compositions to be tested were placed between cellophane sheets and pressed in flat platen laboratory press under a total of 1000 lbs. at a temperature of 180° C., yielding a plaque approximately 6 to 8 mils thick. The plaques were tested according to the method of ASTM test D620–45T under a sunlamp for 240 hours.

*Spew rating*

A plaque of the compounded resin was pressed between cellophane sheets in a Carver press at 180° C., using approximately 1.5 grams of resin, 10 seconds preheat, and 15 seconds with the minimum pressure (pressure indicator just off zero). The plaque was quenched in cold water immediately and an approximately ⅜ inch wide strip was cut from the plaque, the cellophane removed, and the strip oriented to its limit.

The oriented strips were placed in glassine bags under mild pressure so that contact of the strips with the bag was assured. Any exudation of plasticizer could then be noted as an oily streak on the glassine. Tests were carried out at room temperature and at 50° C., the latter condition tending to accenuate any migration of acetal.

Using the acetals of this invention, no spew was observed in this test after 56 days at room temperature. With dioctyl phthalate, a commercial additive, definite spew occurred after one day.

The following table records results obtained with a number of acetals on testing for 100 hours under a sunlamp. The aldehyde and alcohol used to produce each of the acetals is listed therein. The results of the light testing are given in the first column of the results. The spew determination was made at both room temperature and at 50° C., and the results are recorded separately. In the final column the heat results are recorded.

TABLE

| Acetal | | Light Test | Spew Test | | Heat Test |
| --- | --- | --- | --- | --- | --- |
| Aldehyde | Alcohol | | Room Temp. | 50° C. | |
| Control (Dipropyltetrachlorophthalate). | | Good | Good | Good | Poor. |
| Formaldehyde | Phenyl-methyl-carbinol. | do | Fair | Fair | Very good. |
| Benzaldehyde | Benzyl alcohol | Fair | Good | Good | Good. |
| Formaldehyde | do | Good | do | Fair-Good | Do. |
| Do | Phenyl cellosolve. | Fair | do | Fair | Good. |
| Cinnamaldehyde | Benzyl alcohol | do | do | Good | Fair. |
| Benzaldehyde | n-Butanol | do | do | do | Fair-Good. |
| Formaldehyde | Beta-phenyl-ethyl alcohol. | do | do | Fair | Good. |
| Acetaldehyde | Benzyl alcohol | Good | do | Good | Do. |
| p-Chlorobenzaldehyde. | n-Butanol | Fair | do | do | Fair-Good. |
| Acetaldehyde | Phenyl-methyl-carbinol. | Good | do | do | Good. |

It may be observed from the above table that heat stability of the vinylidene resin is considerably enhanced by the presence of the acetal when compared to compositions containing only a normal processing aid such as dipropyltetrachlorophthalate. It may be noted also that the acetals have no tendency to spew from the resin and are not deleterious to light stability.

The heat-stabilizing action of acetals prepared from aliphatic aldehydes decreases in going from formals to the butyrals, etc. Only those prepared from formaldehyde and acetaldehyde are included specifically herein.

To determine the amount of acetal required for heat stability, a series of buttons was prepared according to the foregoing formula, using 8, 6, 4, and 2 parts of dibenzyl formal. The heat stabilizing effect varied directly with the concentration of the formal and indicated that 8 parts were necessary for the best stabilization of the resin.

A similar test was run with varying amounts of di-n-propyl tetrachlorophthalate (DPTC) and dibenzyl formal (DBF) in the foregoing formula, but the time of maintaining hot melts of the various compositions, at the extrusion temperature, before decomposition was evident, was measured and recorded. The results are found in the following table:

| Parts 85/15 Resin | Parts DBF | Parts DPTC | Extrusion Time Prior to Decomposition, min. |
| --- | --- | --- | --- |
| 92 | 8 | 0 | 40 |
| 92.5 | 6 | 1.5 | 40 |
| 93.5 | 4 | 2.5 | 37 |
| 94.5 | 2 | 3.5 | 33 |
| 94.5 | 0 | 5.5 | 30 |

This test verifies the foregoing conclusion that at least 6 parts acetal is necessary for maximum stabilization.

Extrusion

Resin (85/15 vinylidene chlorid/vinyl chloride) compositions containing 6 parts of formal of phenylmethyl carbinol and dibenzyl formal, respectively, were extruded at 170° C. and the 10 mil monofilaments obtained were oriented by cold drawing. Filaments with good color and tensile strength were obtained. From a heat stability standpoint, both performed satisfactorily. Addition of a light stabilizer is desirable for such filaments which are used where exposed to light. The filaments containing formal of phenylmethyl carbinol showed greater stability to light.

The resins referred to herein are homopolymers of vinylidene chloride and copolymers thereof with up to 15 percent of other monomer copolymerized therewith. Increasing the vinyl chloride content of the resin gives polymeric products in which plasticizers generally are more compatible. The comment herein relative to spew is to be considered in the light of the fact that polymers of vinylidene chloride are somewhat less compatible with the processing aids than copolymers containing as much as 15 percent of vinyl chloride or other monomer.

In certain cases it may be desired to use light stabilizers, such as aryl salicylates with the acetals described, alone, and in some cases a small quantity of epoxide, such as glycidyl phenyl ether may be advantageous.

The invention is defined in the claims which follow.

What we claim is:

1. A resin composition which includes a resin selected from the group consisting of homopolymers of vinylidene chloride and copolymers of vinylidene chloride with up to 15 percent by weight, based on the weight of the resin, of other monomer copolymerized therewith, and a substantial amount not in excess of substantially 10 percent by weight, based on the weight of the resin, of an acetal having the formula

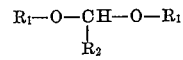

in which $R_1$ is from the group consisting of (1) alkyl groups of 1 to 5 carbon atoms, (2) aralkyl groups in which the aryl group of the aralkyl is from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and the alkyl of the aralkyl contains 1 to 2 carbon atoms, and (3) aryloxyalkyl in which the aryl group is from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and the alkyl group contains 1 to 2 carbon atoms; and $R_2$ is from the group consisting of (1) hydrogen, (2) methyl, (3) styryl, (4) aryl groups from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and (5) aralkyl groups in which the aryl group of the aralkyl is from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and the alkyl group of the aralkyl contains 1 to 2 carbon atoms; provided, however, that when $R_2$ is hydrogen or alkyl, $R_1$ may not be alkyl.

2. The resin composition of claim 1 in which the resin contains substantially 15 percent of vinyl chloride and $R_2$ of the acetal is hydrogen.

3. The resin composition of claim 1 in which the resin contains substantially 15 percent of vinyl chloride and $R_2$ of the acetal is methyl.

4. The resin composition of claim 1 in which the resin contains substantially 15 percent of vinyl chloride and $R_2$ of the acetal is phenyl.

5. The resin composition of claim 1 in which the resin contains substantially 15 percent of vinyl chloride and $R_1$ of the acetal is alpha-phenylethyl.

6. The resin composition of claim 1 in which the resin contains substantially 15 percent of vinyl chloride and $R_1$ of the acetyl is benzyl.

7. The resin composition of claim 1 in which the resin contains substantially 15 percent of vinyl chloride, $R_1$ of the acetal is alpha-phenylethyl and $R_2$ of the acetal is hydrogen.

8. The resin composition of claim 1 in which the resin contains substantially 15 percent of vinyl chloride, $R_1$ of the acetal is benzyl and $R_2$ of the acetal is hydrogen.

9. The resin composition of claim 1 in which the resin contains substantially 15 percent of vinyl chloride, $R_1$ of the acetal is benzyl and $R_2$ of the acetal is phenyl.

10. The resin composition of claim 1 in which the resin contains substantially 15 percent of vinyl chloride, $R_1$ of the acetal is alpha-phenylethyl and $R_2$ of the acetal is methyl.

11. The improvement in the process of extruding a hot melt which includes an acetal as a processing aid and a resin selected from the group consisting of homopolymers of vinylidene chloride and copolymers of vinylidene chloride with up to 15 percent by weight, based on the weight of the resin, of other monomer copolymerized therewith, which improvement consists in heating the resin composition to soften it and extruding it, said acetal being present in a substantial amount not in excess of substantially 10 percent by weight, based on the weight of the resin, and having the formula

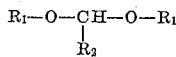

in which $R_1$ is from the group consisting of (1) alkyl groups of 1 to 5 carbon atoms, (2) aralkyl groups in which the aryl group of the aralkyl is from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and the alkyl of the aralkyl contains 1 to 2 carbon atoms, and (3) aryloxyalkyl in which the aryl group is from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and the alkyl group contains 1 to 2 carbon atoms; and $R_2$ is from the group consisting of (1) hydrogen, (2) methyl, (3) styryl, (4) aryl groups from the class consisting of phenyl and substituted phenyls with 1 to 5 substituents from the class of substituents consisting of chlorine and alkyl substituents of 1 to 3 carbon atoms, the total number of carbon atoms in all said alkyl substituents combined being not greater than 4, and (5) aralkyl groups in which the aryl group of the aralkyl is from the class consisting of phenyl and substituted phenyls with 1 to 5 substituents of the class of substituents consisting of chlorine and alkyl substituents of 1 to 3 carbon atoms, the total number of carbon atoms in all said alkyl substituents combined being not greater than 4, and the alkyl group of the aralkyl contains 1 to 2 carbon atoms; provided, however, that when $R_2$ is hydrogen or alkyl, $R_1$ may not be alkyl.

12. The extrusion process of claim 11 in which the resin contains substantially 15 percent of vinyl chloride and $R_2$ of the acetal is hydrogen.

13. The extrusion process of claim 11 in which the resin contains substantially 15 percent of vinyl chloride and $R_2$ of the acetal is methyl.

14. The extrusion process of claim 11 in which the resin contains substantially 15 percent of vinyl chloride and $R_2$ of the acetal is phenyl.

15. The extrusion process of claim 11 in which the resin contains substantially 15 percent of vinyl chloride and $R_1$ of the acetal is alpha-phenylethyl.

16. The extrusion process of claim 11 in which the resin contains substantially 15 percent of vinyl chloride and $R_1$ of the acetal is benzyl.

17. The extrusion process of claim 11 in which the resin contains substantially 15 percent of vinyl chloride, $R_1$ of the acetal is alpha-phenylethyl and $R_2$ of the acetal is hydrogen.

18. The extrusion process of claim 11 in which the resin contains substantially 15 percent of vinyl chloride, $R_1$ of the acetal is benzyl and $R_2$ of the acetal is hydrogen.

19. The extrusion process of claim 11 in which the resin contains substantially 15 percent of vinyl chloride, $R_1$ of the acetal is benzyl and $R_2$ of the acetal is phenyl.

20. The extrusion process of claim 11 in which the resin contains substantially 15 percent of vinyl chloride, $R_1$ of the acetal is alpha-phenylethyl and $R_2$ of the acetal is methyl.

References Cited in the file of this patent

UNITED STATES PATENTS

| | | |
|---|---|---|
| 2,273,436 | Desamari et al. | Feb. 17, 1942 |
| 2,575,444 | Faulkner et al. | Nov. 20, 1951 |